(12) United States Patent
Feast et al.

(10) Patent No.: US 6,340,732 B1
(45) Date of Patent: Jan. 22, 2002

(54) CONJUGATED POLYMERS

(75) Inventors: William Feast, Durham (GB); Rusli Daik, Selangor (ML); Richard Henry Friend; Franco Cacialli, both of Cambridge (GB)

(73) Assignee: Cambridge Display Technology Limited (GB)

( * ) Notice: Subject to any disclaimer, the term of this patent is extended or adjusted under 35 U.S.C. 154(b) by 0 days.

(21) Appl. No.: 09/283,127

(22) Filed: Mar. 31, 1999

(30) Foreign Application Priority Data

Mar. 31, 1998 (GB) .............................. 9806947

(51) Int. Cl.⁷ .......................... C08F 4/08; C08F 214/16
(52) U.S. Cl. ................. 526/291; 526/93; 526/123.1; 526/347; 526/347.1
(58) Field of Search ................. 526/291, 93, 123.1, 526/347

(56) References Cited

U.S. PATENT DOCUMENTS 5,514,878 A * 5/1996 Holmes et al.

* cited by examiner

*Primary Examiner*—Tae H. Yoon
(74) *Attorney, Agent, or Firm*—Finnegan, Henderson, Farabow, Garrett & Dunner

(57) ABSTRACT

Provided is a method for synthesizing a poly(arylene vinylene), which method comprises selecting a vinyl monomer by controlling the ratio of cis isomer to trans isomer in the monomer, and forming the poly(arylene vinylene) from the resulting vinyl monomer, such that the desired cis vinylene to trans vinylene ratio is obtained in the poly (arylene vinylene) product.

17 Claims, No Drawings

CONJUGATED POLYMERS

FIELD OF THE INVENTION

This invention concerns a method for the synthesis of conjugated polymers. In particular the invention concerns a method for producing photoluminescent or electroluminescent conjugated polymers for use in photoluminescent and electroluminescent devices.

BACKGROUND OF THE INVENTION

Conjugated polymers and in particular poly(arylene vinylene)s (PAVs) have attracted increasing interest in recent years as potential electroluminescent and photoluminescent materials. The synthesis of such polymers has thus been the focus of much research.

A common synthetic approach in forming poly(arylene vinylenes) employs the Wessling reaction. In this reaction, a polymer is synthesised which contains arylene units, vinylene units being introduced via an elimination reaction. Such a route is capable of a small degree of selectivity, but good control over vinylene chemistry is not possible in routes which rely on elimination reactions. A route which allows the introduction of some cis vinylene into the polymer backbone is described in Science Vol. 269, page 376 (1995).

A method suitable for the synthesis of soluble poly (arylene vinylenes) is the McMurry reaction. The first effective use of this reaction in the synthesis of PAVs was reported by Feast and Millichamp in Polymer Communication, 1983, 24, 102. PAVs with a polymerisation degree of more than 100 can be produced by the reductive coupling of dialdehydes and diketones.

More recently, aryl boronic acids have been coupled with aryl halides (catalysed by palladium phosphines and sodium carbonate) to produce PAVs (Akta chemica Scandinavia 1993, 47, 221; Macromol Rapid Commun. 1996, 17, 239; Macromolecules 1996, 20, 1082; and Polymer 1989, 30, 1060). This condensation polymerisation route is termed the Suzuki reaction and proceeds under mild conditions tolerating a varied range of functional groups. The Polymers produced show a degree of polymerisation of 100 or more.

A further route to PAVs is a coupling reaction between Grignard reagents and aryl halides, catalysed by nickel compounds. This reaction, termed the Yamamoto reaction, was applied to the preparation of unsubstituted poly-p-phenylene type polymers for the first time by Yamamoto et al in Bull Chem. Soc. Jpn., 1978, 51, 2091. This particular reaction has been limited to the synthesis of poly-p-phenylene and has not yet been reported as a potential route to PAVs.

SUMMARY OF THE INVENTION

The inventors identified a problem in all of the above prior art methods, in that none of the methods allowed for reliable control of the cis/trans vinylene ratio in the polymer products.

Accordingly, the present invention provides a method for synthesizing a poly(arylene vinylene), which method comprises selecting a vinyl monomer by controlling the ratio of cis isomer to trans isomer and forming the poly(arylene vinylene) from the vinyl monomer, such that the desired cis vinylene to trans vinylene ratio is obtained in the poly (arylene vinylene) product.

The present invention also provides a poly(arylene vinylene) obtainable according to the above method, light emitting electronic components or devices comprising the poly(arylene vinylene) and an optical component or device comprising the poly(arylene vinylene). In the context of the present invention, a poly(arylene vinylene) is an oligomer or a polymer which contains in its backbone at least one arylene unit and at least one vinylene unit.

An advantage of the present invention is that the present synthesis allows control of the cis/trans ratio of the vinylene units in the poly(arylene vinylene) products. The invention also makes available poly(arylene vinylene)s having improved electroluminescent and photoluminescent properties, these properties being controlled by varying both the cis/trans vinylene ratio in the polymer, and the vinylene substituents of the polymers.

A further advantage is that the number of in-chain phenylene rings in the repeat units can be varied using the present method, whilst maintaining the solubility of the polymer. In addition, the larger the number of in-chain phenylene rings, the more similar in structure and properties is the polymer to those of poly(p-phenylene), which has been shown to emit in the blue region of the spectrum. By controlling the cis and trans vinylene ratio in the polymer chains it is possible to control the properties of the resultant polymers, particularly the electro-optical properties.

Any vinyl monomer can be used in the method of the present invention, provided that the ratio of the cis isomer to trans isomer in the vinyl monomer can be controlled.

Control of the ratio of cis isomer to trans isomer can be carried out by any means which in turn allows control of the ratio of cis to trans vinylene units in the polymer product. When controlling the ratio of cis isomer to trans isomer in a monomer containing a mixture of both isomers, successive crystallisation is preferably used to select a desired isomer ratio. Alternatively, if both isomers are available in pure form, the correct cis/trans isomer ratio is preferably selected by mixing. Where the vinyl monomer is to be synthesised, the cis/trans ratio is preferably controlled by selecting the appropriate reaction conditions and/or reaction catalyst, and the appropriate purification techniques such as fractionation, distillation, recrystallisation and the various types of chromatography.

In the present invention, the poly(arylene vinylene) is preferably produced via the Yamamoto reaction or the Suzuki reaction.

The Yamamoto reaction is a coupling reaction between Grignard reagents and halides, catalysed by nickel compounds. In the case of coupling aryl groups the reaction can be summarised according to the following reaction scheme:

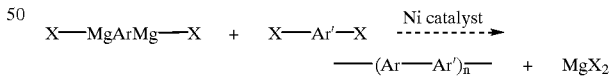

Ar and Ar' can be the same or different. X is a halide group, preferably a bromide group. In the context of the present invention, either or both of the Ar and Ar' groups must contain a vinyl group so that the final product is a poly(arylene vinylene). Only one of the monomers in the above scheme need contain an aryl group to produce a PAV, but it is preferred that both monomers contain an aryl group.

The Suzuki reaction is carried out by coupling a dihalide with a boronic acid derivative. The reaction is preferably carried out in the presence of sodium carbonate and is preferably catalysed by a palladium phosphine complex. In the case of coupling aryl groups, the reaction can be represented schematically as follows:

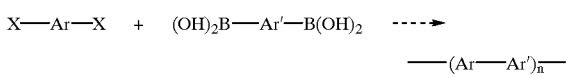

$$\text{———}(Ar\text{———}Ar')_{\overline{n}}\text{———}$$

Ar and Ar' can be the same or different. X is a halide group, preferably a bromide group. In the context of the present reaction either or both of Ar and Ar' must contain a vinyl group, so that a PAV is produced. Only one of the monomers in the above scheme need contain an aryl group to produce a PAV, but it is preferred that both monomers contain an aryl group.

When the Suzuki reaction or the Yamamoto reaction is employed in the method of the present invention, it is preferred that the vinyl monomer is a dibromide but other dihalides can be used. Thus, dichloride and diiodide vinyl monomers may also be employed. If the vinyl monomer contains an aryl group then this can be polymerised in the absence of further monomers to form a poly(arylene vinylene). However, it is preferred in the present invention that the poly(arylene vinylene) is formed by co-polymerising the vinyl monomer with a further monomer. If the vinyl monomer contains aryl groups then the further monomer need not be an aryl monomer. However, it is preferred in the present invention that the further monomer is an aryl monomer, such as a phenyl or biphenyl derivative.

Particularly preferred vinyl monomers for use in the present invention include 1,2-diphenyl-1,2-di(4-bromophenyl)-ethene, or 1,2-dimethyl-1,2-di(4-bromophenyl)-ethene.

In the case where the vinyl monomers themselves are to be synthesised, it is preferred that they are produced by the McMurry reaction in which a diketone or dialdehyde undergoes reductive coupling to produce a vinyl compound.

The present invention allows not only for the control of the cis/trans ratio of the vinylene units in the polymer products, but also the molecular weight of the polymers produced. It has been found that the molecular weight of the polymers is dependent upon the ratio of cis isomer to trans isomer in the vinyl starting materials as well as the solvent system which is used for polymerisation. A cis isomer to trans isomer ratio of approximately 1:1 has been found to give rise to polymers having the largest molecular weight. Similarly, solvents in which the polymers are more soluble are more likely to give rise to high molecular weight products. Accordingly, when the Suzuki reaction is employed in the present method, it is preferred that the reaction takes place in a solvent comprising THF in the presence of aqueous potassium carbonate.

The cis isomer to trans isomer ratio in the vinyl monomer is preferably from 80:20 to 20:80, more preferably 70:30 to 30:70, more preferably still 60:40 to 40:60 and most preferably 45:55 to 55:45.

Inevitably, polymers having a range of molecular weights are produced in any one polymerisation reaction. A poly(arylene vinylene) having the desired molecular weight can be isolated from the reaction products by fractionation.

The molecular weight of the poly(arylene vinylene) products can be affected by the duration of the reaction. In general it is preferred that the reaction is allowed to proceed for 48 hours or more, and in some cases 96 hours or more.

The PAVs produced using the method of the present invention are preferably photoluminescent and more preferably also electroluminescent. It is preferred that the photoluminescence efficiency of the PAVs is, in increasing order of preference, 20% or more, 30% or more, 40% or more, 50% or more, 60% or more or 70% or more. It is also preferred that the electroluminescence efficiency is high, e.g. 20% or more.

DETAILED DESCRIPTION

EXAMPLES

Yamamoto route

Throughout the course of the examples, two dibromide monomers were used, namely 2,3-di(4-bromophenyl)-2-butene and 1,2-di(4-bromophenyl)-1,2-diphenylethene. The McMurry reaction was used to prepare these monomers from the corresponding ketones according to the following reaction scheme:

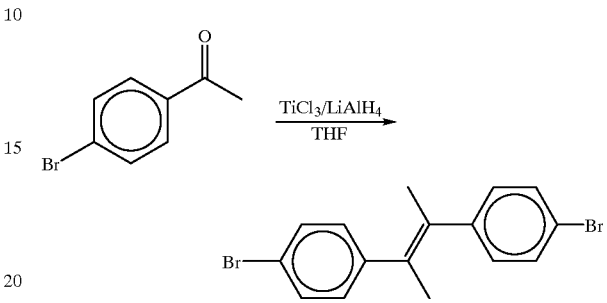

Example 1

Using the Yamamoto reaction, poly(4,4'-diphenylene dimethylvinylene)s were prepared from the corresponding dibromides, according to the following reaction scheme:

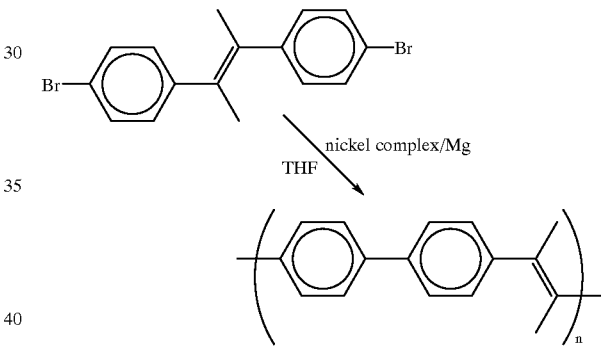

Throughout the synthesis of these polymers, two nickel complexes were used as catalysts, namely bis(triphenylphosphine) nickel dichloride and 1,3-bis(diphenylphosphino)propane nickel dichloride.

Seven runs were completed varying the percent of cis isomer from 100 to 80 and also varying the catalyst used and the reaction time. The results are shown in Table 1.

TABLE 1

| run | reaction time (days) | % cis isomer | catalyst[1,2] | $M_n$ | $M_w$ | DP[3] |
| --- | --- | --- | --- | --- | --- | --- |
| 1 | 2 | 100 | B | 1080 | 1800 | 5 |
| 2 | 2 | 90 | B | 1300 | 2110 | 6 |
| 3 | 2 | 80 | B | 1330 | 2480 | 7 |
| 4 | 4 | 80 | B | 1230 | 2110 | 6 |
| 5 | 2 | 100 | D | 2660 | 4000 | 13 |
| 6 | 2 | 90 | D | 2850 | 4600 | 14 |
| 7 | 2 | 80 | D | 2915 | 5000 | 14 |

[1]B = bis(triphenylphosphine)nickel dichloride
[2]D = 1,3-bis(diphenylphosphine)propane nickel dichloride
[3]DP = degree of polymerisation

Example 2

Poly(4,4'-diphenylene diphenylvinylene)s were produced from the corresponding dibromide monomer according to the Yamamoto reaction as outlined in the following reaction scheme:

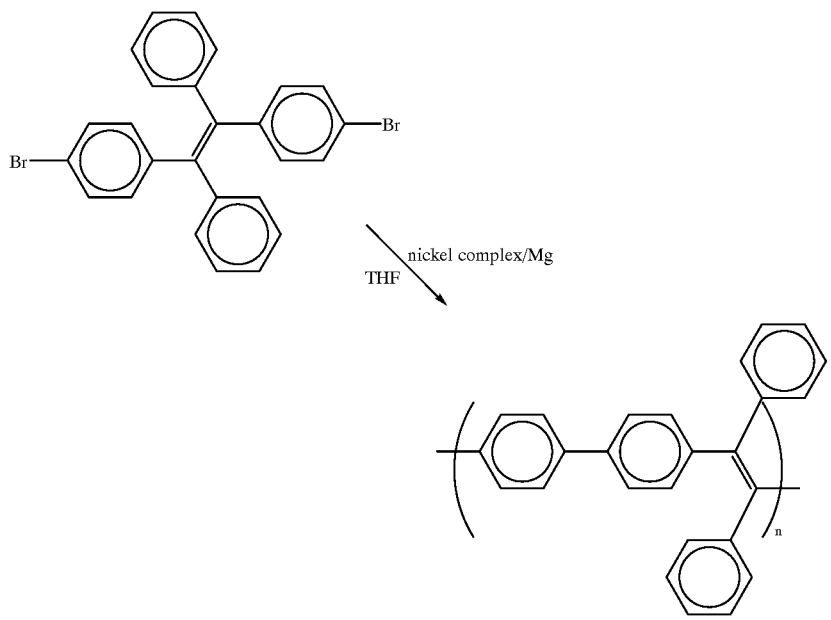

A set of three runs were carried out using a dibromide monomer having an approximately 1:1 mixture of cis and trans isomers, using three different nickel catalysts and a reaction time of two days. The results are outlined in Table 2 below.

TABLE 2

| run | catalyst[1,2,3] | $M_n$ | $M_w$ | DP[4] |
|---|---|---|---|---|
| 1 | B | 3600 | 4900 | 11 |
| 2 | C | 900 | 1650 | 3 |
| 3 | D | 2900 | 3700 | 9 |

[1] B = bis(triphenylphosphine)nickel dichloride
[2] C = nickel acetylacetone
[3] D = 1,3-bis(diphenylphosphino)propane nickel dichloride
[4] DP = degree of polymerisation The polymer was recovered as a yellow precipitate and was found to give a strong greenish yellow fluorescence when irradiated with UV light. Based on a results obtained in the first set of runs, polymerisations of the dibromide monomer mixture with various cis/trans isomer ratios were carried out using nickel complex B as a catalyst. The results obtained are summarised in Table 3 below.

TABLE 3

| run | reaction time (days) | % cis isomer | $M_n$ | $M_w$ | DP[1] |
|---|---|---|---|---|---|
| 1 | 2 | 59 | 1200 | 2200 | 4 |
| 2 | 2 | 48 | 3600 | 4900 | 11 |
| 3 | 2 | 37 | 3300 | 4400 | 10 |
| 4 | 4 | 48 | 4300 | 5600 | 13 |

[1] DP = degree of polymerisation

A similar trend is observed as in the synthesis of poly(4,4'-diphenylenevinylene)s, in that the molecular weight obtained increases as the proportion of cis isomer in the monomer mixture used decreases. The number average molecular weight reaches a maximum value where an approximately 1:1 mixture of cis and trans isomers was used in the monomer. Thus in this case the use of a monomer containing approximately a 1:1 ratio of cis to trans isomer is required in order to produce a high molecular weight polymer. An increase in the reaction time from 2 to 4 days increases the degree of polymerisation.

It can be seen from the above that controlling the cis/trans isomer ratio in the monomer when employing the Yamamoto polycondensation provides a useful route for the synthesis of poly(4,4'-diphenylene dimethylvinylene)s and poly(4,4'-diphenylene diphenylvinylene)s and related products. The cis trans ratio of vinylenes in the polymer chain can be successfully controlled using this route and this can in turn be used to control the molecular weight and luminescence properties of the polymers.

Suzuki Route

The Suzuki reaction was employed using two aryl dibromides and two aryl diboronic acid monomers. The synthesis of 1,1-di(4-bromophenyl)-1,2-diphenylethene and 2,3-di(4-bromphenyl)-2-butene was carried out as described previously. In both cases the products were recovered as a mixture of cis and trans isomers which could be separated by repeated crystallisation. The isomers alone or their mixtures could be used in conjunction with either 1,4-benzene diboronic acid or 4,4'-diphenyl di-boronic acid to produce structurally defined poly(arylene vinylene)s. Aryl diboronic acids were purchased from Lancaster Synthesis Ltd (>98% purity) and used without purification.

Example 3

Poly(tri-p-phenylene diphenylvinylene) was produced from 1,4-benzene diboronic acid and 1,2-di(4-bromophenyl)-1,2-diphenylethene, using various ratios of cis and trans isomers in the monomer, according to the following reaction scheme:

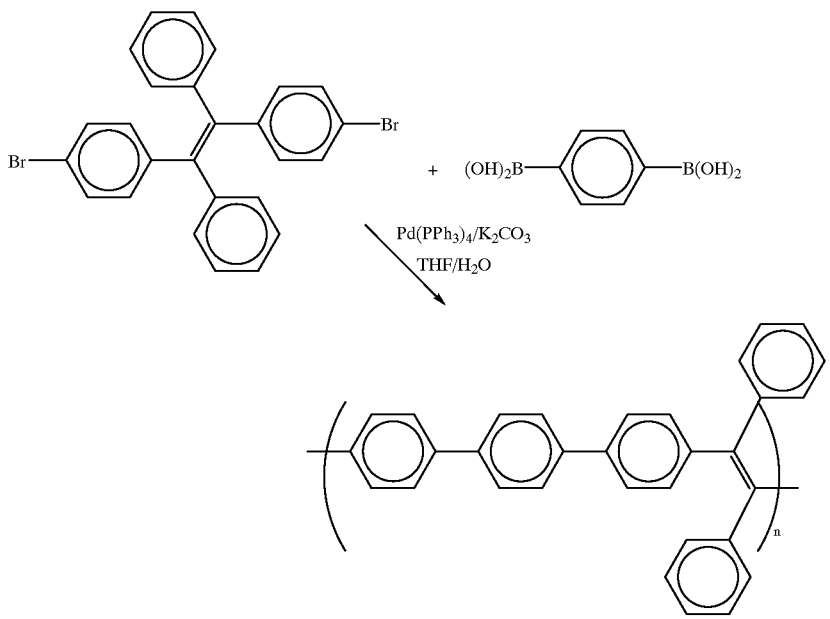

After refluxing the reaction mixture for approximately two days, it was allowed to cool to room temperature and was concentrated by evaporating the solvent to about half of the original volume. This solution was poured into methanol and the resultant precipitate was recovered as a greenish yellow powder. Table 4 represents the results obtained.

TABLE 4

| run | % cis isomer | reaction time (days) | $M_n^1$ | $M_w^1$ | $DP^2$ | mass recovery[3] (%) |
|---|---|---|---|---|---|---|
| 1 | 62 | 2 | 1200 | 1800 | 3 | 6 |
| 2 | 48 | 4 | 1500 | 2000 | 4 | 53 |
| 3 | 48 | 2 | 1300 | 1700 | 3 | 46 |
| 4 | 37 | 2 | 1200 | 1600 | 3 | 8 |

[1] by GPC, "polystyrene equivalents"
[2] DP-Degree of polymerisation
[3] after re-precipitation into methanol from chloroform It was found that the recovered material was photoluminescent. It gave a palish green yellow fluorescence when exposed to UV radiation. The maximum mass recovery of the product was obtained from experiments using approximately a 1:1 cis/trans ratio.

Example 4

The polymerisation procedure outlined in Example 3 was followed to prepare poly(tri-p-phenylene dimethylvinylene) from 1,4-benzene diboronic acid and 2,3-di(4-bromophenyl)-2-butene mixtures and with various cis/trans isomer ratios. The reaction scheme for the trans isomer is shown below:

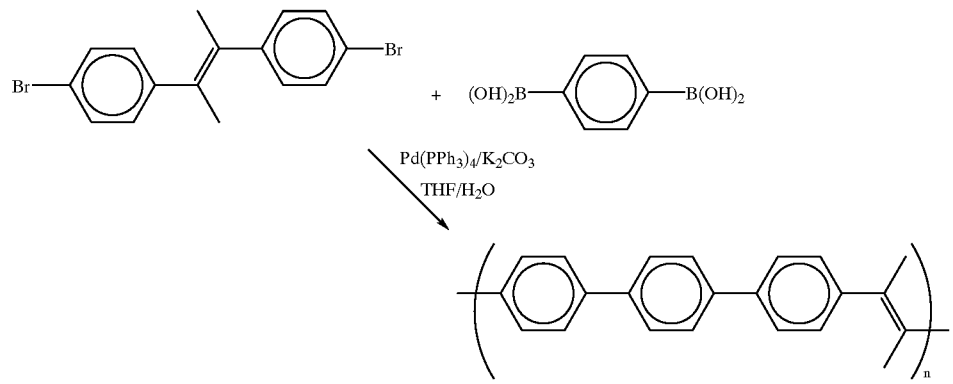

The results obtained are set out in Table 5 below.

TABLE 5

| run | % cis isomer | reaction time (days) | $M_n^1$ | $M_w^1$ | $DP^2$ | mass recovery[3] (%) |
|---|---|---|---|---|---|---|
| 1 | 0 | 2 | 1250 | 1800 | 4 | 67 |
| 2 | 81 | 2 | 1900 | 2750 | 7 | 80 |
| 3 | 84 | 4 | 1700 | 2800 | 6 | 90 |
| 4 | 97 | 2 | 1600 | 2050 | 6 | 40 |

[1] by GPC, "polystyrene equivalents"
[2] DP = degree of polymerisation
[3] after re-precipitation into methanol from chloroform The products were recovered as faint orange precipitates which gave a very weak orange fluorescence when irradiated with light.

Example 5

Poly(tetra-p-phenylene diphenylvinylene was prepared via the Suzuki coupling reaction from 4,4'-biphenyl diboronic acid and 1,2-di(4-bromophenyl)-1,2-diphenylethene mixtures with various cis/trans isomer ratios. The polymerisation procedure established in the earlier examples was followed. The following reaction scheme illustrates the process for the trans isomer:

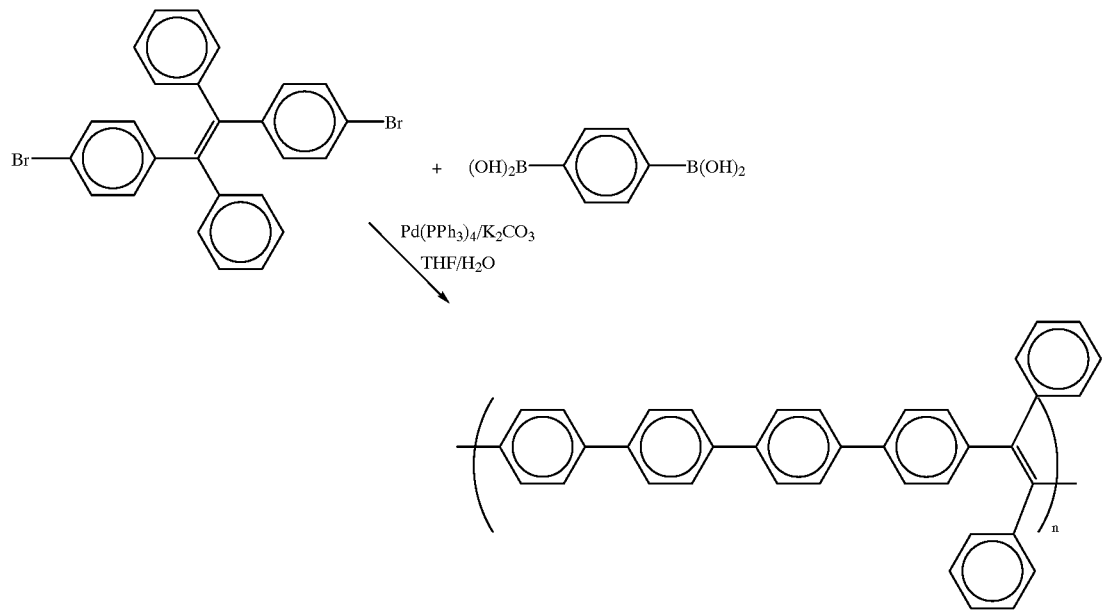

The results obtained are summarised in Table 6 below.

TABLE 6

| run | reaction time (days) | % cis isomer | $M_n^1$ | $M_w^1$ | $DP^1$ | mass recovery[3] % |
|---|---|---|---|---|---|---|
| 1 | 2 | 0 | 2190 | 3350 | 5 | 78 |
| 2 | 2 | 32 | 3250 | 6200 | 7 | 51 |
| 3 | 2 | 48 | 4280 | 8300 | 9 | 50 |
| 4 | 2 | 62 | 2800 | 4500 | 6 | 62 |

TABLE 6-continued

| run | reaction time (days) | % cis isomer | $M_n^1$ | $M_w^1$ | $DP^1$ | mass recovery[3] % |
|---|---|---|---|---|---|---|
| 5 | 2 | 100 | 2900 | 4800 | 6 | 85 |
| 6 | 4 | 32 | 3470 | 5850 | 7 | 90 |

[1] as measured on pristine samples by GPC, "polystyrene equivalents"
[2] DP = degree of polymerisation
[3] after re-precipitation into methanol from chloroform The polymer was recovered as a yellow precipitate and gave a strong greenish yellow fluorescence when exposed to UV light. It can be seen that the molecular weight obtained varies with the cis/trans isomer ratio. The highest number average molecular weight was obtained when a monomer mixture with approximately a 1:1 ratio of cis to trans isomers was used in the polymerisation (see run 3).

In order to produce polymers of higher molecular weight which were free from oligomers, an equilibrium fractionation was carried cut using the samples of Table 6. As a result, polymer fractions of higher molecular weight and relatively narrow molecular weight distribution were obtained. The fractions with the highest molecular weight from each run are set out in table 7 below.

TABLE 7

| run | reaction time (days) | % cis isomer | $M_n^1$ | $M_w^1$ | $PDI^1$ $(M_w/M_n)$ | $DP^2$ |
|---|---|---|---|---|---|---|
| 1 | 2 | 0 | 2750 | 4400 | 1.6 | 6 |
| 2 | 2 | 32 | 8300 | 13800 | 1.7 | 17 |
| 3 | 2 | 48 | 9550 | 15100 | 1.6 | 20 |
| 4 | 2 | 62 | 5000 | 9400 | 1.9 | 10 |

TABLE 7-continued

| run | reaction time (days) | % cis isomer | $M_n^1$ | $M_w^1$ | PDI[1] ($M_w/M_n$) | DP[2] |
|---|---|---|---|---|---|---|
| 5 | 2 | 100 | 4350 | 7050 | 1.6 | 9 |
| 6 | 4 | 32 | 16300 | 27900 | 1.7 | 34 |

[1]as measured on the highest molecular weight fraction by GPC, "polystyrene equivalents"
[2]DP = degree of polymerisation The same trend as observed in the polymer products is again found in the fractionated samples. The sample obtained from run 3 in which the dibromide monomer mixture with a cis/trans isomer ratio of approximately 1:1 was used gave the highest number average molecular weight. When the reaction time was extended to 4 days, a degree of polymerisation of 34 was found which corresponds to a reaction conversion of 97% of the polymer in this fraction, underlining the potential of this route to useful poly(arylene vinylene)s.

Example 6

The procedure outlined in Example 5 was followed to prepare poly(tetra-p-phenylene dimethylvinylene) from 4,4'-biphenyl diboronic acid and 2,3-di(4-bromophenyl)-2-butene mixtures with various cis/trans isomer ratios. The scheme below summarises this process for poly(tetra-p-phenylene dimethylvinylene) preparation from the trans dibromide monomer:

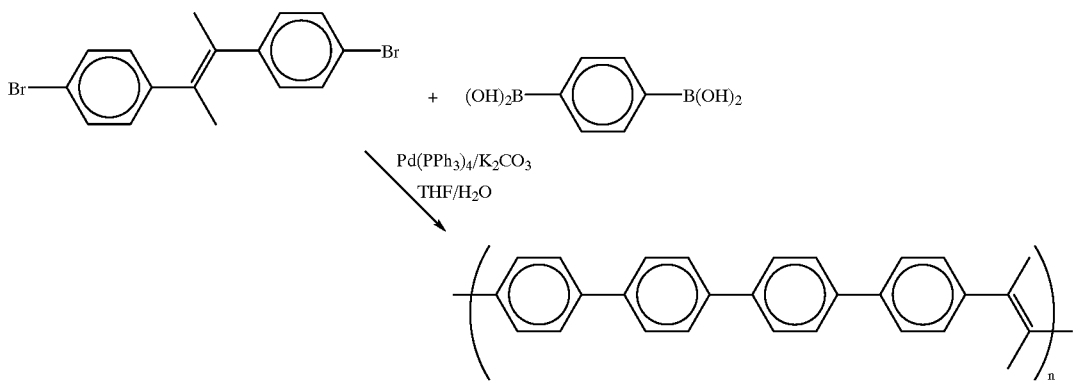

Products were recovered as faint yellow powders and were found to give pale yellow fluorescence under radiation. It was found that the products recovered were largely insoluble in organic solvents, thus full characterisation was not possible. The reaction conditions used and the results obtained are summarised in Table 8 below.

TABLE 8

| run | % cis isomer | reaction time (days) | $M_n^1$ | $M_w^1$ | mass recovery[2] (%) |
|---|---|---|---|---|---|
| 1 | 0 | 2 | * | * | 83 |
| 2 | 81 | 2 | 1126 | 1944 | 77 |

TABLE 8-continued

| run | % cis isomer | reaction time (days) | $M_n^1$ | $M_w^1$ | mass recovery[2] (%) |
|---|---|---|---|---|---|
| 3 | 97 | 2 | 1140 | 1179 | 53 |
| 4 | 81 | 4 | * | * | 83 |

[1]as analysed on soluble portion of samples by GPC, "polystyrene equivalents"
[2]after re-precipitation into methanol from chloroform * samples are insoluble It can be seen from the above examples that it is possible to synthesise a poly(arylene vinylene) having a controlled cis/trans vinylene ratio in the polymer chain. The highest molecular weights are obtained using a 1:1 cis/trans vinylene ratio. This is possibly a consequence of the inherent solubility of the products. Thus fully trans polymers are likely to be rigid rods which will tend to be rather insoluble, whilst fully cis polymers will inevitably be very tightly coiled preventing solvation and also being highly insoluble. Such polymers would precipitate at an early stage in their growth and would thus have lower molecular weight. On this basis, the control of the cis/trans ratio can be used to control the molecular weight.

UV Visible absorption studies

A summary of the UV absorption data for polymers prepared according to the present invention and polymers prepared according to the McMurry reaction is set out in Table 9.

TABLE 9

| samples | synthetic routes | % cis isomer[1] | $M_n^{2,3}$ | $\lambda_{max}$ (nm)[4] |
|---|---|---|---|---|
| PDPV | McMurry | | 2000 | 350 |
| PDPV | Yamamoto | 48 | 1900 | 352 |
| P3PV-DP | Suzuki | 48 | 1530 | 347 |
| P4PV-DP | Suzuki | 48 | 2050 | 344 |
| PDMeV | Yamamoto | 80 | 1300 | 290 |
| P3PV-DMe | Suzuki | 80 | 1890 | 309 |
| P4PV-DMe | Suzuki | 80 | | 314 |
| m-PPV-DP | McMurry | | 2000 | 310 |

TABLE 9-continued

| samples | synthetic routes | % cis isomer[1] | $M_n$[2,3] | $\lambda_{max}$ (nm)[4] |
|---|---|---|---|---|
| m-PPV-DM | McMurry | | 1000 | 377 |
| PDPV-DF | McMurry | | 3000 | 400 |

[1]only polymers prepared via Yamamoto and Suzuki routes could be structurally defined
[2]"polystyrene equivalent" values
[3]molecular weight of P4PV-DMe could not be determined by GPC due to poor solubility
[4]$\lambda_{max}$ = peak of first absorption In the table, PDPV is poly(4,4'-diphenylene diphenylvinylene), P3PV-DP is poly(tri-p-phenylene diphenylene), P4PV-DP is poly(tetra-p-phenylene dimethylvinylene), PDMeV is poly(4,4'-diphenylene dimethylvinylene), P3PV-DMe is poly(tri-p-phenylene dimethylvinylene), P4PV-DMe is poly(tetra-p-phenylene dimethylvinylene), m-PPV-DP is poly(1,3-diphenylene diphenylvinylene), m-PPV-DM is poly(1,3-phenylene dimesitylvinylene) and PDPV-DF is poly(4,4'-diphenylene-1,2-bis(pentafluorophenyl)vinylene).

From the table it can be seen that among the polymers produced PDPV has the smallest band gap. Increasing the number of phenyl rings in the polymer repeat units was shown to increase the band gap of the resultant polymer (see PDPV, P3PV-DP and P4PV-DP).

An increase in the size of the band gap was observed when an in-chain phenyl link with a metal linkage was introduced into the polymer repeat unit (see PDPV and m-PPV-DP). However, the result from the fluorinated PDPV was unexpected in that the polymer was expected to have a larger band gap than that of the non-fluorinated analogue (see PDPV and PDPV-DF) but did not. Replacing phenyl with methyl as a pendant group also resulted in an increase in band gap (see for example PDPV and PDMeV).

Luminescence Studies

Poly(4,4'-diphenylene diphenylvinylene) samples with varying molecular weights and cis/trans vinylene ratios were prepared via the Yamamoto polycondensation and examined for their photoluminescence characteristics. Measurements were carried out by photoexciting the samples with an Argon-ion laser which lases in the UV to green region of the spectrum with two dominating lines at 351 and 364 nm. The results are summarised in Table 10 below.

TABLE 10

| | | | photoluminescence | |
|---|---|---|---|---|
| samples | % cis isomer | $M_n$[1] | efficiency (%) | $\lambda_{max}$ (nm) |
| 1 | 59 | 1200 | 35.0 | 522 |
| 2 | 48 | 1900 | 41.4 | 515 |
| 3 | 37 | 2900 | 35.2 | 523 |

[1]"polystyrene equivalent" values

It can be seen that photoluminescence efficiency varies with the cis/trans isomer ratio of the monomer mixture used in the polymerisation. For samples of similar molecular weight the maximum efficiency was obtained from the polymer prepared using a monomer mixture with an approximately 1:1 cis/trans isomer ratio.

Poly(tetra-p-phenylene diphenyvinylene) samples were prepared with varying cis/trans vinylene contents and molecular weights, via the Suzuki coupling reaction. Photoluminescence characteristics were measured and the results are depicted in Table 11 below.

TABLE 11

| | | | photoluminescence | |
|---|---|---|---|---|
| samples | % cis isomer | $M_n$[1] | efficiency (%) | $\lambda_{max}$ (nm) |
| 1 | 97 | 2900 | 28.6 | 524 |
| 2 | 62 | 5000 | 30.1 | 533 |
| 3 | 48 | 4200 | 53.5 | 520 |
| 4 | 32 | 2800 | 35.8 | 517 |
| 5 | 32 | 8300 | 32.5 | 521 |
| 6 | 32 | 16300 | 21.7 | 523 |
| 7 | 2 | 1800 | 30.7 | 496 |

[1]"polystyrene equivalent" values

It can be seen from these results that luminescence efficiency and cis/trans isomer ratio are correlated. The highest efficiency is obtained when an approximately 1:1 cis/trans isomer ratio is used. In Table 11 Samples 4–6 which contain the same cis/trans vinylene ratio, show a progressive increase in the emission peak wavelength with increase in molecular weight. This is consistent with the hypothesis that increasing molecular weight extends the conjugation length and hence decreases the band gap of the polymer. A similar trend to that found in the case of poly(4,4'-diphenylene diphenylvinylene) prepared via the Yamamoto polycondensation was observed. In particular the photoluminescence efficiency obtained varied with the cis/trans isomer ratios of the monomer mixture used in the polymerisation.

The relatively low efficiency observed in Sample 7 can be attributed to the virtually fully trans vinylene structure in the polymer chain which probably leads to the formation of a highly ordered conjugated polymer. In such an ordered polymer the mobility of electrons and excited species will be enhanced and this results in a higher possibility of excited species meeting photoluminescence quenching sites before decaying radiatively.

Table 11 shows that photoluminescence efficiency decreases with increasing molecular weight (see Samples 4–6). This suggests that photoluminescence quenching sites are present in the higher molecular weight polymers which might arise from structural defects or impurities.

The above examples show that the size of the band gap in poly(arylene vinylene)s can be controlled chemically by varying the pendant groups and the number of phenyl rings in the polymer repeat unit. The photoluminescence efficiency varies with the cis/trans vinylene ratio in the polymer and maximum photoluminescence efficiency can be obtained with an approximate 1:1 ratio of cis and trans vinylene content.

Using the methods of the present invention improved photoluminescent and electroluminescent poly(arylene vinylene)s can be produced. Such polyarylene vinylenes can be used in electronic components or devices or in optical components or devices. Electronic and optical devices include photoluminescent devices, electroluminescent devices, waveguide devices and photovoltaic devices. Devices in which the polymers made according to the present invention can be used are described in WO 90/13148 and U.S. Pat. No. 5,512,654.

What is claimed is:

1. A method for synthesizing a poly(arylene vinylene) which method comprises selecting a vinyl monomer by the ratio of cis isomer to trans isomer in the monomer, wherein the ratio is from 80:20 to 20:80, and forming the poly (arylene vinylene) from the vinyl monomer, to obtain photoluminescent or electroluminescent properties in the poly (arylene vinylene) product.

2. A method according to claim 1, wherein the ratio of cis isomer to trans isomer is controlled using crystallization.

3. A method according to claim 1 or claim 2, wherein the vinyl monomer comprises an aryl group.

4. A method according to claim 1 or claim 2, wherein the vinyl monomer is a dihalide.

5. A method according to claim 4, wherein the vinyl monomer is a dibromide.

6. A method according to claim 5, wherein the vinyl monomer is selected from the group consisting of 1,2diphenyl-1,2-di(4-bromophenyl)ethene, and 1,2-dimethyl-1,2di(4-bromophenyl)ethene.

7. A method according claim 1 or claim 2, wherein the poly(arylene vinylene) is formed by polymerising the vinyl monomer with a further monomer.

8. A method according to claim 7, wherein the further monomer is an aryl monomer.

9. A method according to claim 8, wherein the further monomer is selected from a group consisting of phenyl groups and biphenyl groups.

10. A method according to claim 1 or claim 2, wherein the poly(arylene vinylene) is formed using a reaction selected from the group consisting of a Yamamoto reaction and a Suzuki reaction.

11. A method according to claim 10, wherein the Suzuki reaction is used and the reaction takes place in a solvent comprising tetrahydrofuran in the presence of aqueous potassium carbonate.

12. A method according to claim 1 or claim 2, wherein the ratio of cis isomer to trans isomer in the vinyl monomer is from 45:55 to 55:45.

13. A method according to claim 1 or claim 2, wherein the vinyl monomer is formed via a McMurry reaction.

14. A method according to claim 1 or claim 2, further comprising isolating the poly(arylene vinylene) by fractionation.

15. A method according to claim 1 or claim 2, wherein the reaction forming the poly(arylene vinylene) is allowed to proceed for 48 hrs or more.

16. A method according to claim 15, wherein the reaction forming the poly(arylene vinylene) is allowed to proceed for 96 hrs or more.

17. A method for synthesizing a poly(arylene vinylene) polymer comprising synthesizing a batch of vinyl monomer containing a preselected ratio of cis isomer to trans isomer of from 80:20 to 20:80, and forming the poly(arylene vinylene) polymer from the batch of vinyl monomer to obtain photoluminescent or electroluminescent properties in the poly(arylene vinylene) polymer.

\* \* \* \* \*

UNITED STATES PATENT AND TRADEMARK OFFICE
CERTIFICATE OF CORRECTION

PATENT NO. : 6,340,732
DATED : January 22, 2002
INVENTOR(S) : Feast et al.

Page 1 of 1

It is certified that error appears in the above-identified patent and that said Letters Patent is hereby corrected as shown below:

<u>Column 15,</u>
Line 11, delete "according claim" and insert -- according to claim --

Signed and Sealed this

Seventh Day of May, 2002

Attest:

Attesting Officer

JAMES E. ROGAN
Director of the United States Patent and Trademark Office